(12) United States Patent
Tkadlec et al.

(10) Patent No.: US 11,996,875 B2
(45) Date of Patent: May 28, 2024

(54) FILTERS INCLUDING BANDPASS FILTER TRANSMISSION LINES

(71) Applicant: CommScope Italy, S.R.L., Agrate Brianza (IT)

(72) Inventors: Roman Tkadlec, Valasske Klobouky (CZ); Stefano Tamiazzo, Milan (IT); Marco Riva, Monticello Brianza (IT)

(73) Assignee: CommScope Italy S.r.l., Agrate Brianza (IT)

(*) Notice: Subject to any disclaimer, the term of this patent is extended or adjusted under 35 U.S.C. 154(b) by 241 days.

(21) Appl. No.: 17/690,182

(22) Filed: Mar. 9, 2022

(65) Prior Publication Data
US 2022/0294483 A1  Sep. 15, 2022

(30) Foreign Application Priority Data
Mar. 15, 2021  (IT) .................. 102021000006053

(51) Int. Cl.
*H04B 1/16* (2006.01)
*H04B 1/18* (2006.01)

(52) U.S. Cl.
CPC .......... *H04B 1/163* (2013.01); *H04B 1/1607* (2013.01); *H04B 1/18* (2013.01)

(58) Field of Classification Search
CPC ..... H01P 1/2053; H04B 1/1607; H04B 1/163; H04B 1/18
See application file for complete search history.

(56) References Cited

U.S. PATENT DOCUMENTS

| 5,781,085 A * | 7/1998 | Harrison | H01P 5/04 333/202 |
| 2013/0222080 A1* | 8/2013 | Katipally | H01P 1/208 333/203 |
| 2022/0255207 A1* | 8/2022 | Facchini | H01P 1/2053 |
| 2022/0344792 A1* | 10/2022 | Zhu | H04B 1/18 |

OTHER PUBLICATIONS

"Extended European Search Report for European Application No. 22162021.4, dated Aug. 12, 2022, 11 pages".
"A. I. Abunjalleh and I. C. Hunter, "Tunable Bandpass and Bandstop Filters Based on Dual-Band Combline Structures," in IEEE Transactions on Microwave Theory and Techniques, vol. 58, No. 12, pp. 3710-3719, Dec. 2010, doi: 10.1109/TMTT.2010.2083950."
"D. Psychogiou, R. Gómez-García and D. Peroulis, "Fully Adaptive Multiband Bandstop Filtering Sections and Their Application to Multifunctional Components," in IEEE Transactions on Microwave Theory and Techniques, vol. 64, No. 12, pp. 4405-4418, Dec. 2016."
(Continued)

*Primary Examiner* — Nguyen T Vo
(74) *Attorney, Agent, or Firm* — Myers Bigel, P.A.

(57) ABSTRACT

Filters include a housing having an input port and an output port and a plurality of resonant cavities within the housing. Each resonant cavity may include a respective notch resonator. The filter may further include a bandpass filter that includes a plurality of bandpass resonators, the bandpass filter extending between the input port and the output port. The bandpass filter may replace a transmission line that is included in conventional filters.

20 Claims, 7 Drawing Sheets

(56) References Cited

OTHER PUBLICATIONS

"G. Macchiarella and S. Tamiazzo, "Design techniques for dual-passband filters," In IEEE Transactions on Microwave Theory and Techniques, vol. 53, No. 11, pp. 3265-3271, Nov. 2005, doi: 10.1109/TMTT.2005.855749."

"Italian Search Report corresponding to Italian Application No. 102021000006053, dated Nov. 29, 2021, 12 pages (English Translation on p. 8-12)".

* cited by examiner

FILTERS INCLUDING BANDPASS FILTER TRANSMISSION LINES

CROSS-REFERENCE TO RELATED APPLICATION

The present application claims priority to Italian Patent Application Serial No. 102021000006053, filed Mar. 15, 2021, the entire content of which is incorporated herein by reference.

BACKGROUND

The present invention relates generally to communications systems and, more particularly, to filters that are suitable for use in cellular communications systems.

Filters are electronic devices that selectively pass signals based on the frequency of the signal. Various types of filters are used in cellular communications systems. As new generations of cellular communications services have been introduced—typically without phasing out existing cellular communications services—both the number and types of filters that are used has expanded significantly. Filters may be used, for example, to allow radio frequency ("RF") signals in different frequency bands to share selected components of a cellular communications system and/or to separate RF data signals from power and/or control signals. In many applications, filters may be incorporated within a base station antenna. As the number of filters used in a typical cellular communications system has proliferated, the need for smaller, lighter and/or less expensive filters has increased.

The "response" of a filter refers to the amount of energy that passes from a first port (e.g., an input port) of the filter to a second port (e.g., an output port) of the filter as a function of frequency. A filter response will typically include one or more passbands, which are frequency ranges where the filter passes signals with relatively small amounts of attenuation. A filter response also typically includes one or more stopbands. A stopband refers to a frequency range where the filter will substantially not pass signals, usually because the filter is designed to reflect backwards any signals that are incident on the filter in this frequency range. In some applications, it may be desirable that the filter response exhibit a high degree of "local selectivity," meaning that the transition from a passband to an adjacent stopband occurs over a narrow frequency range. Metal resonant cavity filters are typically used in applications where the filter response must exhibit a high degree of local selectivity. One technique for enhancing local selectivity is to add transmission zeros in the filter response. A "transmission zero" refers to a portion of a filter frequency response where the amount of signal energy that passes is very low.

One type of filter that is commonly used in cellular communications applications is the interference mitigation filter. An interference mitigation filter is a two-port device that passes RF energy in a first frequency band (the "passband") while attenuating or "rejecting" RF energy in a second frequency band (the "stopband"). In many applications, the passband and the stopband may be located close to each other, and hence the filter may need to exhibit a high degree of local selectivity. Interference mitigation filters may be used, for example, at base stations that are shared by two different cellular operators. Each cellular operator may mount base station antennas on an antenna tower associated with the base station, and these base station antennas may provide service in the same frequency bands. In order to limit interference between the antennas operated by the different cellular operators, the first cellular operator may transmit and receive RF signals in respective first and second sub-bands of a particular operating frequency band while the second cellular operator may transmit and receive RF signals in respective third and fourth sub-bands of this operating frequency band. For example, the first cellular operator may transmit RF signals in the 1930-1940 MHz sub-band and may receive RF signals in the 1850-1860 MHz sub-band of the 1850-1990 MHz operating frequency band. In this situation, the second (co-located) cellular operator would be assigned different sub-bands and might, for example, transmit RF signals in the 1960-1970 MHz sub-band and may receive RF signals in the 1880-1890 MHz sub-band. In such a situation, the first cellular operator may use an interference mitigation filter (or two interference mitigation filters, one for each sub-band) that passes RF signals in the 1850-1860 MHz and 1930-1940 MHz sub-bands while rejecting RF signals in the 1880-1890 MHz and 1960-1970 MHz sub-bands in order to minimize the impact that the equipment of the second cellular operator has on communications quality. Likewise, the second cellular operator may use an interference mitigation filter (or two interference mitigation filters) that passes RF signals in the 1880-1890 MHz and 1960-1970 MHz sub-bands while rejecting RF signals in the 1850-1860 MHz and 1930-1940 MHz sub-bands in order to minimize the impact that the equipment of the first cellular operator has on communications quality.

Interference mitigation filters may be implemented using a bandpass filter approach. FIG. 1A is a top view of a conventional interference mitigation filter 100 (with the covers thereof removed) that is implemented as a resonant cavity bandpass filter that creates a stopband (attenuation) above a pair of passbands as shown in FIG. 1B. As shown in FIG. 1A, the filter 100 includes a metallic housing 110 that has a floor 112, exterior walls 114 and interior walls 116. The housing 110 may be formed, for example, by die casting or machining. The interior walls 116 define a plurality of resonant cavities 120. A plurality of coaxial resonating elements or "resonators" 130 are provided, with a resonator 130 in each of the resonant cavities 120. Each resonator 130 extends upwardly from the floor 112 of the housing 110 and may be implemented, for example, as a metal TEM resonator. Openings 118 that are commonly referred to as "windows" are formed in some of the interior walls 116. The windows 118 allow the resonators 130 in adjacent ones of the resonant cavities 120 to couple with each other. An internal metal cover (not shown) is provided that serves as the top of the filter 100. The internal metal cover may have a shape and size substantially similar to the floor 112 and may be attached to the upper surface of the exterior and interior walls 114, 116 of the housing 110 via, for example, screws (the threaded holes 115 for the screws are visible in FIG. 1). An external cover (not shown) may be attached over the internal cover to cover the tuning screws.

The filter 100 further includes an input port 150 and an output port 152 that are used to couple RF signals into and out of the housing 110. In the depicted embodiment, the input port 150 and the output port 152 are each formed as a respective coaxial connector that has an outer conductor contact that is physically and electrically connected to the housing 110 and a center conductor contact that extends through an exterior wall 114 of the housing 110 and into the interior of the housing 110. A connectorized coaxial input cable may be coupled to the input port 150 and a connectorized coaxial output cable may be coupled to the output port 152. A plurality of resonators 140 are also provided that extend between the input port 150 and the output port 152. The particular filter 100 depicted in FIG. 1A is a dual bandpass filter that has a transmit passband and a transmit stopband as well as a receive passband (see FIG. 1B). Tuning screws or other tuning elements (not shown) are provided that extend through the metal cover (not shown). For example, tuning screws may be coaxially aligned with each resonator 130, 140 and tuning screws may also be provided between adjacent resonators 130, 140. The tuning screws may be used to tune the center frequencies of the passband and the stopband as well as the size or "bandwidth" of the passband and the stopband.

When an RF signal is input at the input port 150, RF energy within the passband of filter 100 passes through the resonant cavities 120 (via the windows 118 in the interior walls 116) and along the large cavity along the lower edge of the filter that includes the resonators 140 and is output through the output port 152. RF energy within the stopband of filter 100 is reflected backwardly and hence does not pass to the output port 152. The filter 100 has a reciprocal response and hence behaves in the same manner when RF energy is input at port 152 and output at port 150. The response of filter 100 is shown in FIG. 1B, which is a plot showing the amount (in dB) that the magnitude of an input RF signal is reduced by the filter as a function of frequency. Two passbands are present at the left hand side of the plot, while a stopband is present at the right hand side of the plot. The lower of the two passbands is primarily generated by the resonators 140, while the upper of the two passbands is primarily generated by the resonators 130. The arrangement of the resonators 130, 140 and the coupling windows 118 in FIG. 1A create five transmission zeros immediately above the upper passband to provide the sharp transition and the high level of rejection in the stopband.

Interference mitigation filters that are implemented using the bandpass filter approach of FIG. 1A may be relatively simple to design and may be easy to tune. However, these filters typically require a relatively large number of resonators and are typically relatively large in size.

Interference mitigation filters may alternatively be implemented using a bandstop or "notch" filter approach. FIG. 2 is a top view of a conventional interference mitigation filter 200 (with the covers thereof removed) that is implemented using a bandstop filter approach. As shown in FIG. 2, the filter 200 includes a metallic housing 210 that has a floor 212, exterior walls 214 and interior walls 216. The housing 210 may be formed, for example, by die casting or machining. The interior walls 216 define a plurality of resonant cavities 220. A plurality of resonators 230 are provided, with a resonator 230 in each of the resonant cavities 220. Each resonator 230 extends upwardly from the floor 212 and is implemented as a dielectric TE01 resonator in the depicted embodiment. An internal metal cover (not shown) is provided that serves as the top of the filter 200. The internal metal cover may have a shape and size substantially similar to the floor 212 and may be attached to the upper surface of the exterior walls 214 via, for example, screws (the threaded holes 215 for the screws are visible in FIG. 2). An external cover (not shown) may be attached over the internal cover to cover the tuning screws.

Similar to filter 100, filter 200 includes an input port 250 and an output port 252 that are used to couple RF signals into and out of the housing 210. The input and output ports 250, 252 may be substantially identical to the input and output ports 150, 152, and hence further description thereof will be omitted. The filter 200 further includes an RF transmission line 260 that has a first end that is coupled to the center conductor contact of the input port 250 and a second end that is coupled to the center conductor contact of the output port 252. The RF transmission line 260 may be implemented, for example, as a coaxial transmission line, a stripline transmission line or a microstrip transmission line. In the depicted embodiment, the transmission line is implemented as an air stripline transmission line. Spurs or "stubs" 262 extend from the RF transmission line 260 into each resonant cavity 220, and each spur 262 may extend around a portion of a respective one of the dielectric TE01 resonators 230. Tuning screws or other tuning elements (not shown) are provided that extend through the internal metal cover (not shown). As the tuning elements may be identical to the corresponding tuning elements of filter 100, further description thereof will be omitted.

When an RF signal is input at the input port 250, RF energy within the passband of filter 200 passes along the RF transmission line 260 to the output port 252. RF energy within the stopband of filter 200 passes into the resonant cavities 220 and is reflected backwardly and hence does not pass to the output port 252.

FIG. 3A is a top view of a conventional interference mitigation filter 200' (with the covers removed), where the filter is again implemented as a resonant cavity notch filter with a transmission line extending between the input and output ports. The filter 200' is very similar to filter 200 of FIG. 2, except that filter 200' includes metal TEM resonators 230' instead of the dielectric TE01 resonators 230 of filter 200. FIG. 3B is a graph of the frequency response of the filter of FIG. 3A. As shown by the rectangular structures in the plot, the filter design requires two passbands (at about 824-849 MHz and 869-889 MHz) and one stopband (at about 890-915 MHz). The notch structure realizes a single passband that covers both the passband frequency ranges. The resonators 230' generate the stopband response shown in FIG. 3B. The vertical axis in FIG. 3B shows the RF signal level at the output of the filter 200' relative to the RF signal level at the input to the filter in dB.

Interference mitigation filters that are implemented using the notch filter approach of FIGS. 2 and 3A may include fewer resonators and be smaller than an interference mitigation filter having similar performance that is implemented using the bandpass filter approach of FIG. 1. Moreover, the interference mitigation filters that are implemented using the notch filter approach of FIGS. 2 and 3A will typically have lower attenuation within the passband (i.e., have better insertion loss performance) and may exhibit higher power handling capabilities. However, interference mitigation filters that are implemented using the notch filter approach of FIGS. 2 and 3A tend to be more complex than interference mitigation filters that are implemented using the bandpass approach, may have limited tunability, and may exhibit higher sensitivity to thermal variation.

SUMMARY

Pursuant to embodiments of the present invention, filters are provided that include a housing having an input port and an output port and a plurality of resonant cavities within the housing. Each resonant cavity may include a respective notch resonator. The filter may further include a bandpass filter that includes a plurality of bandpass resonators, the bandpass filter extending between the input port and the output port. The filter is an interference mitigation filter that includes a passband and a stopband, and the notch resonators are configured to generate a plurality of nulls within the stopband.

In some embodiments, a first of the nulls may be in a bottom half of the stopband and a second of the nulls may be within a top half of the stopband. In other embodiments, a first of the nulls may be in a bottom third of the stopband, a second of the nulls may be within middle third of the stopband, and a third of the nulls may be within a top third of the stopband. In still other embodiments, a first of the nulls may be in a bottom quarter of the stopband, a second of the nulls may be within a quarter of the of the stopband that is between the bottom quarter of the stopband and a center frequency of the stopband, and a third of the nulls may be within a top quarter of the stopband. In this case, optionally none of the nulls may be within a quarter of the stopband that is between the top quarter of the stopband and the center frequency of the stopband.

In some embodiments, the filter may only have a passband on one side of the stopband.

In some embodiments, a first subset of the resonant cavities may be on a first side of the bandpass filter, and a second subset of the resonant cavities may be on a second, opposite side of the bandpass filter. In such embodiments, a resonant cavity that is electrically closest to the input port may be configured to generate a first of the plurality of nulls that is closest to the passband, and a resonant cavity that is electrically closest to the output port may be configured to generate a second of the plurality of nulls that is farthest from the passband. A resonant cavity that is electrically second closest to the input port may be configured to generate a third of the plurality of nulls that is second closest to the passband. A resonant cavity that is electrically second closest to the output port may be configured to generate a fourth of the plurality of nulls that is second farthest from the passband.

In some embodiments, a first of the resonant cavities that is configured to generate a first of the plurality of nulls that is closest to the passband may not be electrically adjacent a second of the resonant cavities that is configured to generate a second of the plurality of nulls that is farthest from the passband. In other embodiments, a first of the resonant cavities that is configured to generate a first of the plurality of nulls that is farthest from the passband may be electrically adjacent a second of the resonant cavities that is configured to generate a second of the plurality of nulls that is second farthest from the passband. In still other embodiments, at least half of the resonant cavities may electrically couple to the bandpass filter in between a first location where a first of the resonant cavities that is configured to generate a first of the plurality of nulls that is closest to the passband electrically couples to the bandpass filter and a second location where a second of the resonant cavities that is configured to generate a second of the plurality of nulls that is farthest from the passband electrically couples to the bandpass filter.

In some embodiments, the bandpass filter may be configured to directly pass RF signals between the input port and the output port that have frequencies within a passband frequency range of the filter, and/or the resonant cavities may be configured to substantially block RF signals that have frequencies within a stopband frequency range of the filter from passing through the filter.

In some embodiments, the passband frequency range may have a first bandwidth, and a range of frequencies between the passband frequency range and the stopband frequency range may be less than twice the first bandwidth, or less than the first bandwidth.

In some embodiments, the resonant cavities may each include a window that opens to the bandpass filter. In some embodiments, no windows may be provided between resonant cavities.

In some embodiments, the bandpass resonators may be arranged in a staggered line that extends substantially from the input port to the output port.

In some embodiments, the bandpass resonators may be disposed between a first wall and a second wall, and at least some of the resonant cavities may be on one side of the first wall and the bandpass resonators may be on the other side of the first wall. The first wall may include a plurality of first openings that allow RF energy to pass from the bandpass filter into the resonant cavities that are on the first side of the first wall. In some embodiments, additional of the resonant cavities may be on one side of the second wall and the bandpass resonators may be on the other side of the second wall, and the second wall may include a plurality of second openings that allow RF energy to pass from the bandpass filter into the additional of the resonant cavities. In other embodiments, the second wall may be an external wall of the housing.

In some embodiments, the bandpass resonators may be shaped differently than the notch resonators.

Pursuant to further embodiments of the present invention, filters are provided that include a housing having an input port and an output port, a transmission line that extends between the input port and the output port, and a plurality of resonant cavities within the housing, each resonant cavity including a respective first resonator. In these filters, the transmission line is implemented as a bandpass filter that includes a plurality of second resonators.

Pursuant to still further embodiments of the present invention, filters are provided that include a housing having a floor, a first wall and a second wall, a plurality of resonators that are positioned between the first wall and the second wall, the resonators and the first and second walls comprising a bandpass filter, and a first plurality of resonant cavities formed within the housing. The first wall forms a portion of each resonant cavity in the first plurality of resonant cavities.

Figure 1A:
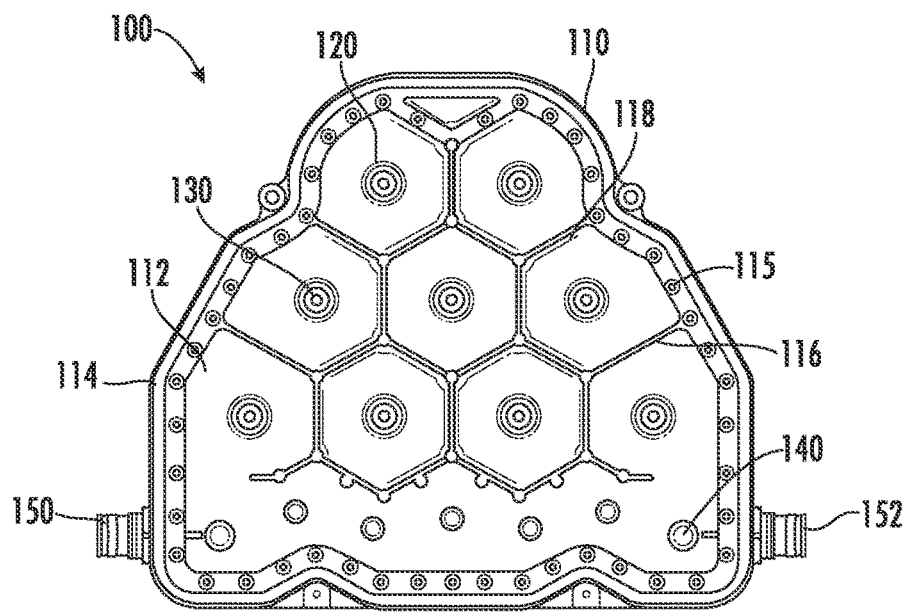
FIG. 1A is a top view of a conventional interference mitigation filter with the covers removed, where the filter is implemented as a resonant cavity bandpass filter.

Note that herein when multiple of the same elements or structures are provided, they may be referred to in some instances using two-part reference numerals, where the two parts are separated by a dash. Herein, such elements may be referred to individually by their full reference numeral (e.g., interior wall xxx-x) and may be referred to collectively by the first part of the applicable reference numeral (e.g., internal walls xxx).

DETAILED DESCRIPTION

The most delicate part of an interference mitigation filter that is implemented using the notch filter approach is the RF transmission line that extends from the input port to the output port. Aside from the interface between a top internal cover and the exterior walls, the RF transmission line is typically the most common source of passive intermodulation ("PIM") distortion in the filter. As such, the RF transmission line must be manufactured and installed to very precise specifications in order to minimize the risk of PIM distortion. The RF transmission line must be very precisely located with respect to other elements of the filter to guarantee that the filter operates properly. Typically, plastic spacers and/or screws are used to hold the RF transmission line in position. These plastic parts are typically formed of specialized plastic materials in order to minimize their impact on RF performance. Unfortunately, these materials may negatively impact the cost of the filter, and installation of the RF transmission line using numerous plastic screws/spacers complicates the manufacturing process.

Pursuant to embodiments of the present invention, interference mitigation filters are provided that include an integrated bandpass filter that acts as the RF transmission line of the filter. As noted above, conventional interference mitigation filters that are implemented using the notch filter approach include conventional RF transmission line structures such as coaxial transmission lines, stripline transmission lines or microstrip transmission lines. These transmission lines have extremely wide bandwidths, and are capable of passing signals having frequencies from 0 Hz to tens of GHz. Many interference mitigation filters, however, need only to pass a relatively narrow bandwidth of frequencies, such as frequencies in a 1-100 MHz range. For example, a typical application might require passing RF signals within a 20 MHz frequency band that is centered around 2 GHz, meaning that the passband is only 1% of the operating frequency. A bandpass filter can readily pass RF signals in such a passband with very low insertion loss, and hence the interference mitigation filters according to embodiments of the present invention replace the conventional RF transmission line with a bandpass filter.

As described above, the RF transmission lines used in conventional interference mitigation filters may be sensitive (i.e., small variations in the transmission line may impact performance) and are complex structures that are formed using expensive materials. A bandpass filter-based transmission line may be formed by simply adding additional resonators to the filter, and this can be accomplished, for example, by forming additional resonators during the die casting process, resulting in little extra cost or complexity. The interference mitigation filters according to embodiments of the present invention may be significantly less expensive than conventional interference mitigation filters, and may have improved PIM distortion performance and reduced sensitivity to thermal variations. The filters according to embodiments of the present invention may also be easier to tune and may be tuned over a much wider range. As a result, in some cases, the same filter may be used for different passband and stopband combinations simply by tuning the filter differently.

Pursuant to some embodiments of the present invention, filters are provided that include a housing having an input port and an output port and a plurality of resonant cavities within the housing. Each resonant cavity may include a respective notch resonator. The filter may further include a bandpass filter that includes a plurality of bandpass resonators, the bandpass filter extending between the input port and the output port.

Pursuant to further embodiments of the present invention, filters are provided that include a housing having an input port and an output port, a transmission line that extends between the input port and the output port, and a plurality of resonant cavities within the housing, each resonant cavity including a respective first resonator. In these filters, the transmission line is implemented as a bandpass filter that includes a plurality of second resonators.

Pursuant to still further embodiments of the present invention, filters are provided that include a housing having a floor, a first wall and a second wall, a plurality of resonators that are positioned between the first wall and the second wall, the resonators and the first and second walls comprising a bandpass filter, and a first plurality of resonant cavities formed within the housing, wherein the first wall forms a portion of each resonant cavity in the first plurality of resonant cavities.

In any of the above filters, the bandpass filter may be configured to directly pass RF signals between the input port and the output port that have frequencies within a passband frequency range of the filter, and the resonant cavities may be configured to substantially block RF signals that have frequencies within a stopband frequency range of the filter from passing through the filter. In some embodiments, the passband frequency range may have a first bandwidth, and a range of frequencies between the passband frequency range and the stopband frequency range may be less than twice the first bandwidth, or less than the first bandwidth. The resonant cavities may each include a window that opens to the bandpass filter. No windows may be provided between resonant cavities. In some embodiments, the bandpass resonators may be arranged in a staggered line that extends substantially from the input port to the output port. In some embodiments, the filter may be an interference mitigation filter.

Embodiments of the present invention will now be discussed in greater detail with reference to FIGS. 4-7.

Figure 2:
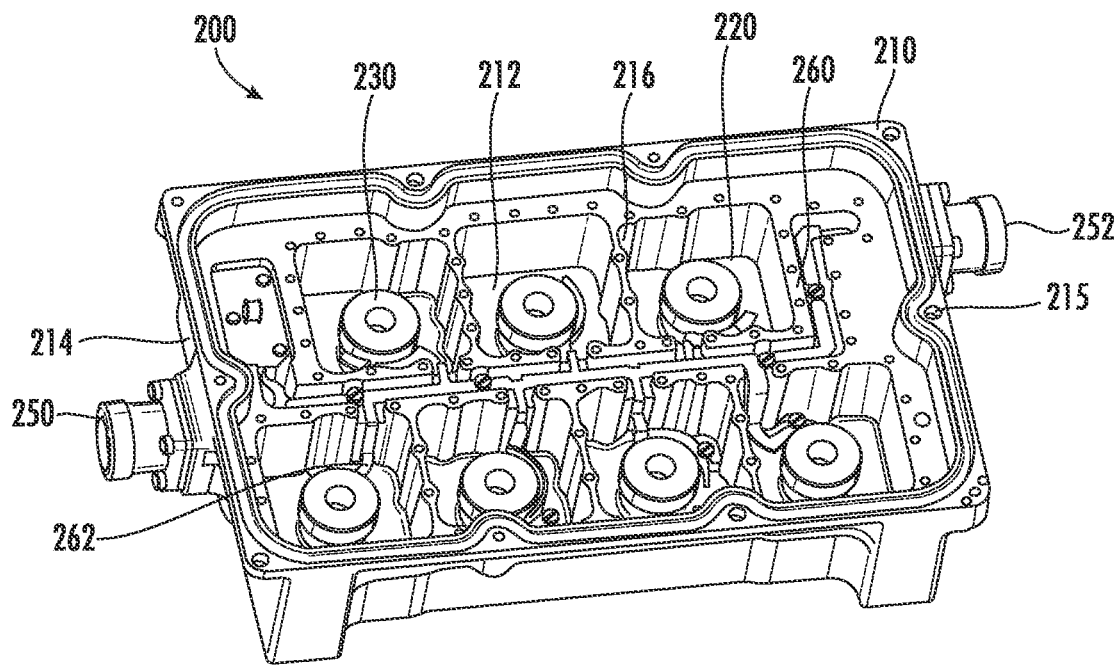
FIG. 2 is a top view of another conventional interference mitigation filter with the covers removed, where the filter is implemented as a resonant cavity notch filter with a transmission line extending between the input and output ports.
Figure 3A:
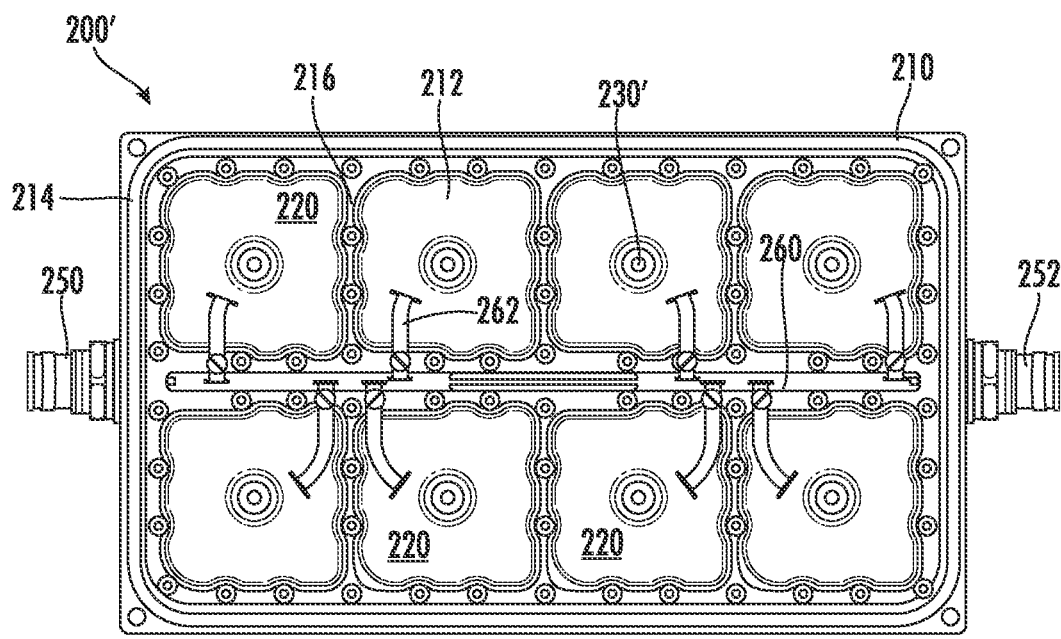
FIG. 3A is a top view of another conventional interference mitigation filter with the covers removed, where the filter is again implemented as a resonant cavity notch filter with a transmission line extending between the input and output ports.
Figure 4:
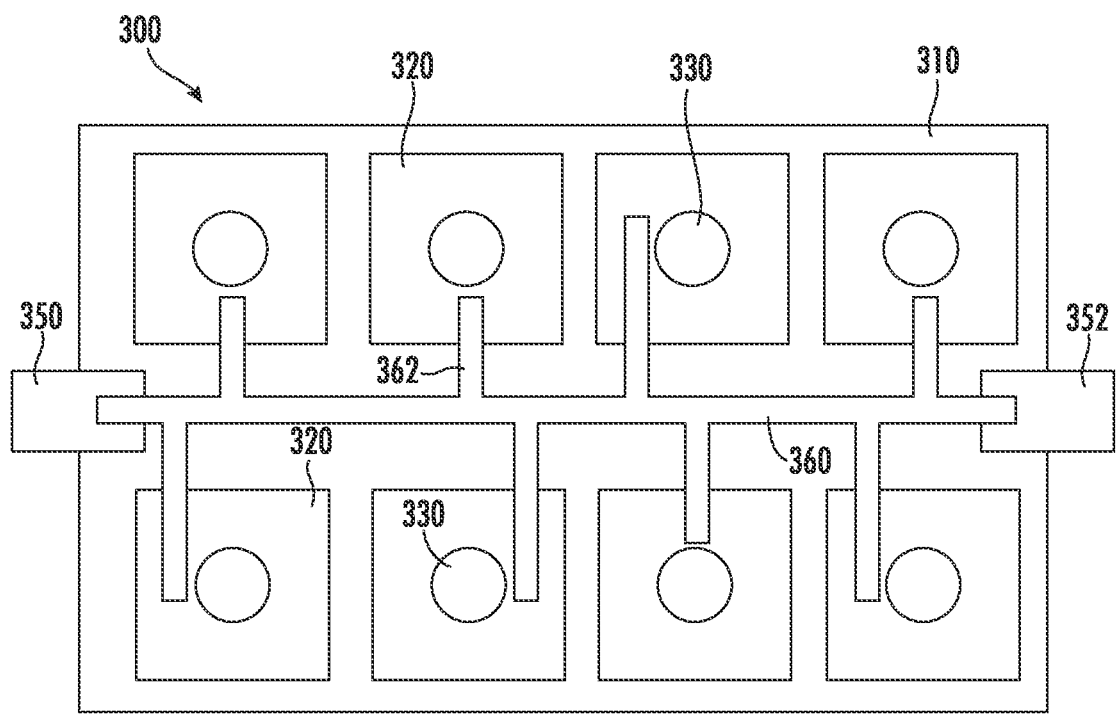
FIG. 4 is a schematic diagram of a conventional interference mitigation filter.

FIG. 4 is a schematic diagram of a conventional interference mitigation filter 300 that is implemented using the notch filter approach. The filter 300 may be considered to be a schematic diagram of the filter 200 of FIG. 2 or the filter 200' of FIG. 3A. As shown in FIG. 4, the conventional filter 300 includes a housing 310, a plurality of resonant cavities 320, a plurality of resonators 330, an input port 350, an output port 352, and an RF transmission line 360. Each resonant cavity 320 may include a respective one of the resonators 330. The RF transmission line 360 extends between the input port 350 and the output port 352, and includes a plurality of spurs (branches) 362 that extend into the resonant cavities 320 to couple with the resonators 330.

Figure 5:
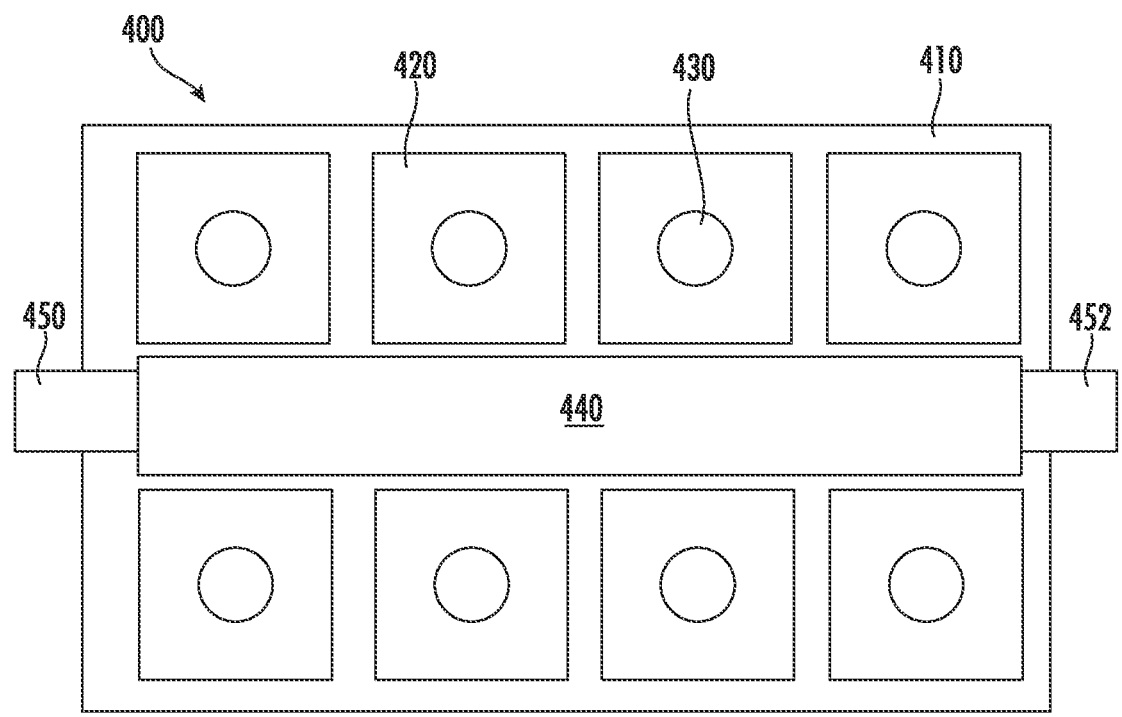
FIG. 5 is a schematic diagram of an interference mitigation filter according to embodiments of the present invention.

FIG. 5 is a schematic diagram of an interference mitigation filter 400 according to embodiments of the present invention. As shown, the filter 400 may be substantially identical to the filter 300 except that the RF transmission line 360 of filter 300 is replaced with a bandpass filter 440 in filter 400.

While the bandpass filter 440 is a distinct structure, it will be appreciated by those of skill in the art that the bandpass filter 440 typically will not operate independently of the resonant cavities 420 and the resonators 430 that generate the stopband response of filter 400. Thus, it will be appreciated that when the stopband portion of filter 400 is detuned (e.g., the tuning screws are removed or set at locations that do not provide the desired frequency response), then the location of the passband in the response of bandpass filter 440 will also be impacted. Thus, when the stopband portion of filter 400 is detuned, the bandpass filter 440 may not have a passband that corresponds to the desired passband for the filter 400 (e.g., it may be moved to another portion of the frequency spectrum) and/or may not even have a conventional bandpass response. However, once the stopband portion of filter 400 is properly tuned for operation, the bandpass filter 440 will then exhibit a classic bandpass response and the bandpass response will cover the passband for the filter 400. Thus, it will be appreciated that the bandpass filter transmission lines included in the filters according to embodiments of the present invention are not independent structures, but instead will have responses that are impacted by the design and/or tuning of the remainder of the filter. However, once the remainder of the filter is appropriately tuned, the bandpass filter transmission lines according to embodiments of the present invention will exhibit a bandpass response that covers the desired passband for the filter.

Figure 6A:
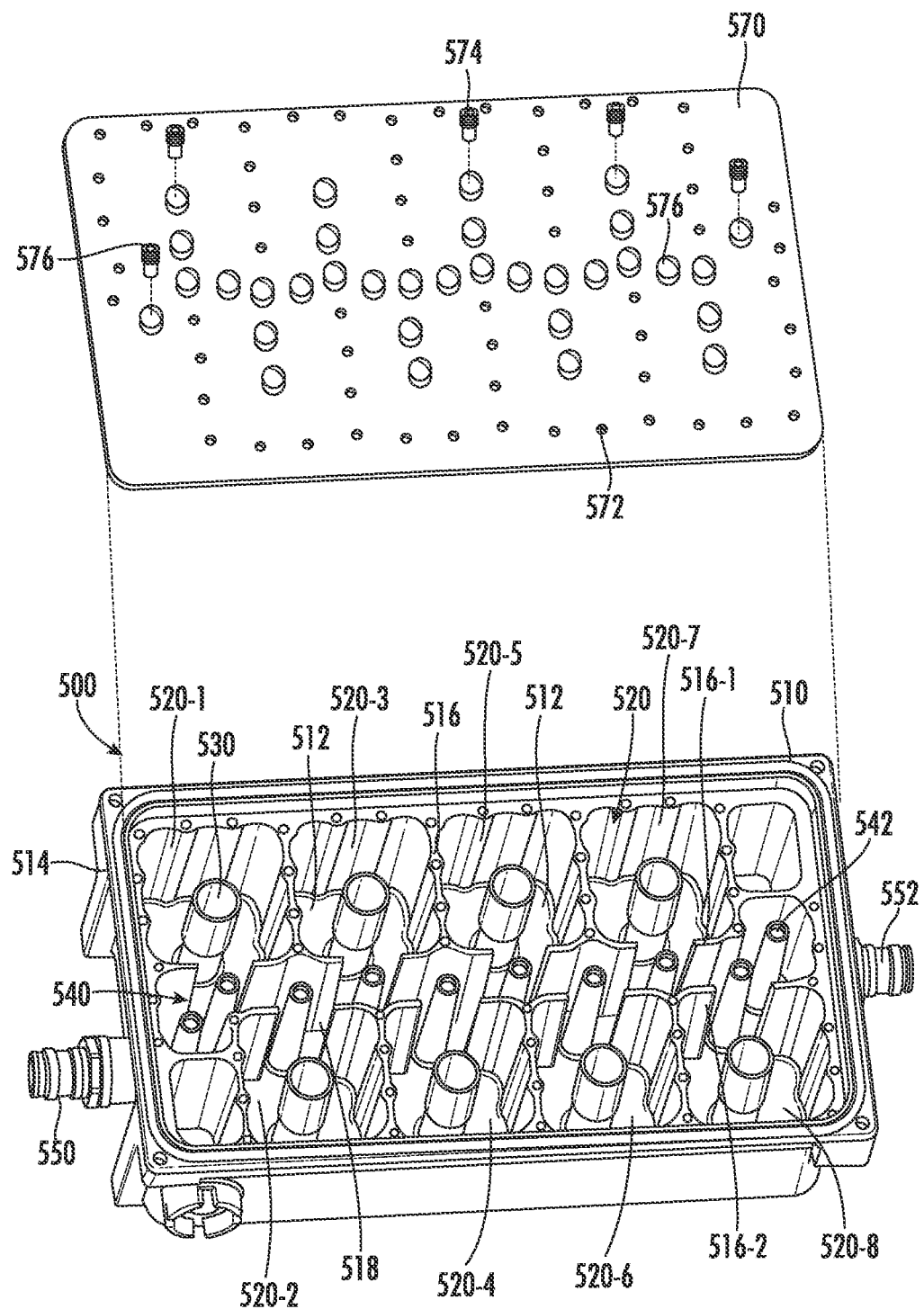
FIG. 6A is a schematic perspective top view of an interference mitigation filter according to embodiments of the present invention.

FIG. 6A is a schematic exploded perspective top view of an interference mitigation filter 500 according to embodiments of the present invention. As shown in FIG. 6A, the filter 500 includes a metallic housing 510 (e.g., a metal housing or a dielectric housing having a metal coating thereon) that has a floor 512, exterior walls 514 and interior walls 516. The housing 510 may be formed, for example, by die casting or machining. The interior walls 516 define a plurality of resonant cavities 520. A plurality of resonators 530 are provided, with a resonator 530 in each of the resonant cavities 520. Each resonator 530 extends upwardly from the floor 512. The resonators 530 may be implemented, for example, as dielectric TE01 or TM resonators or as metal TEM resonators. The resonators 530 may be referred to herein as "notch" resonators as they are mounted in resonant cavities and configured to form a notch-type (stopband) filter response. The resonant cavities 520 and resonators 530 may be configured to substantially block RF signals that have frequencies within a stopband frequency range of the filter 500 from passing through the filter 500.

The filter 500 further includes an input port 550 and an output port 552 that are used to couple RF signals into and out of the housing 510. The input port 550 and the output port 552 are each formed as a coaxial connector that has an outer conductor contact that is physically and electrically connected to the housing 510 and a center conductor contact that extends through an opening in an exterior wall 514 of the housing 510 and into the interior thereof. A connectorized coaxial input cable (not shown) may be coupled to the input port 550 and a connectorized coaxial output cable (not shown) may be coupled to the output port 552. A plurality of resonators 542 are also provided that extend between the input port 550 and the output port 552. The resonators 542 extend between a pair of interior walls 516-1, 516-2 and are configured to form a bandpass filter 540. The resonators 542 may be referred to herein as "bandpass" resonators as they are configured to form a bandpass filter 540 that passes RF signals in a passband of filter 500 directly from the input port 550 to the output port 552. In other words, RF signals within the passband frequency range of the filter 500 only flow along the path of the bandpass filter 540 and substantially do not enter the resonant cavities 520. The bandpass resonators 542 may be implemented, for example, as metal TEM resonators in some embodiments, although other types of resonators may alternatively be used. The bandpass resonators 542 may be arranged in a staggered fashion, as shown in FIG. 6A, so that each resonator 542 may couple with adjacent resonators 542 as well as with non-adjacent resonators 542. For example, the bandpass resonators 542 may be arranged in a staggered line that extends substantially from the input port 550 to the output port 552, as shown in FIG. 6A. It will also be appreciated that the resonators can be arranged in an interdigital form where the resonators are, for example alternately fixed to the bottom of housing and to the internal cover 570 (and the notch resonators 530 can be fixed to the internal cover 570 as well). The bandpass resonators 542 may have shapes and/or sizes that are different from the notch resonators 530, and may or may not be formed using the same general type of resonator (e.g., metal TEM resonators) as the notch resonators 530.

The first interior wall 516-1 and the second interior wall 516-2 each extend the length of the filter 500 in the depicted embodiment. The bandpass resonators 542 are positioned between interior sides of the first and second interior walls 516-1, 516-2. A first subset of the resonant cavities 520 are on the exterior side of the first interior wall 516-1, and a second subset of the resonant cavities 520 are on the exterior side of the second interior wall 516-2. Windows 518 are formed in interior walls 516-1, 516-2. The windows 518 allow RF energy to couple from the bandpass filter 540 into the resonant cavities 520. The windows 518 may be relatively large. In some embodiments the windows may be open from the floor 512 to the internal metal cover 570 (described below) of the filter 500 in order to allow for sufficient coupling between the bandpass resonators 542 and the notch resonators 530. Windows are not provided between any of the resonant cavities 520. In other words, the resonant cavities 520 may only open to the bandpass filter 540 in some embodiments.

The bandpass filter 540, which acts as a transmission line that extends between the input port 550 and the output port 552, is configured to couple with each of the notch resonators 530. In particular, the windows 518 in the first wall 516-1 and the second wall 516-2 provide an RF transmission path from the bandpass filter 540 into each resonant cavity 520. Each window 518 in the first and second walls 516-1, 516-2 is positioned adjacent a respective one of the bandpass resonators 542. As can be seen in FIG. 6A, a majority of the bandpass resonators 542 (here all but the two on the ends of the transmission line) are configured so that they will each directly couple with a respective one of the notch resonators 530.

An internal metal cover 570 is provided that encloses the resonant cavities 520 and the bandpass filter 540. The internal cover 570 includes a plurality of openings 572 that are aligned with the threaded openings 515 in housing 510.

Set screws (not shown) are threaded into the openings 572 and openings 515 in order to attach the internal cover 570 to the upper surface of the exterior walls 514. A plurality of tuning screws (or other tuning elements) 574, 576 are mounted in the internal cover 570 (only a few respective tuning screws 574, 576 are shown). The tuning screws 574 may be coaxially aligned with the resonators 530, 542, and the tuning screws 576 may be positioned so that when inserted into the interior of the housing 510 they will be between adjacent ones of the resonators 530, 542. The tuning screws 574, 576 may be used to tune the center frequencies of the passband and the stopband as well as the size or "bandwidth" of the passband and the stopband. An external cover (not shown) may be attached over the internal cover 570 to cover the tuning screws 574, 576.

When an RF signal is input at the input port 550, RF energy within the passband of filter 500 passes directly from the input port 550 to the output port 552 via the bandpass filter 540. RF energy within the stopband of filter 500 passes into the resonant cavities 520 and is reflected backwardly and hence does not pass to the output port 552.

Figure 3B:
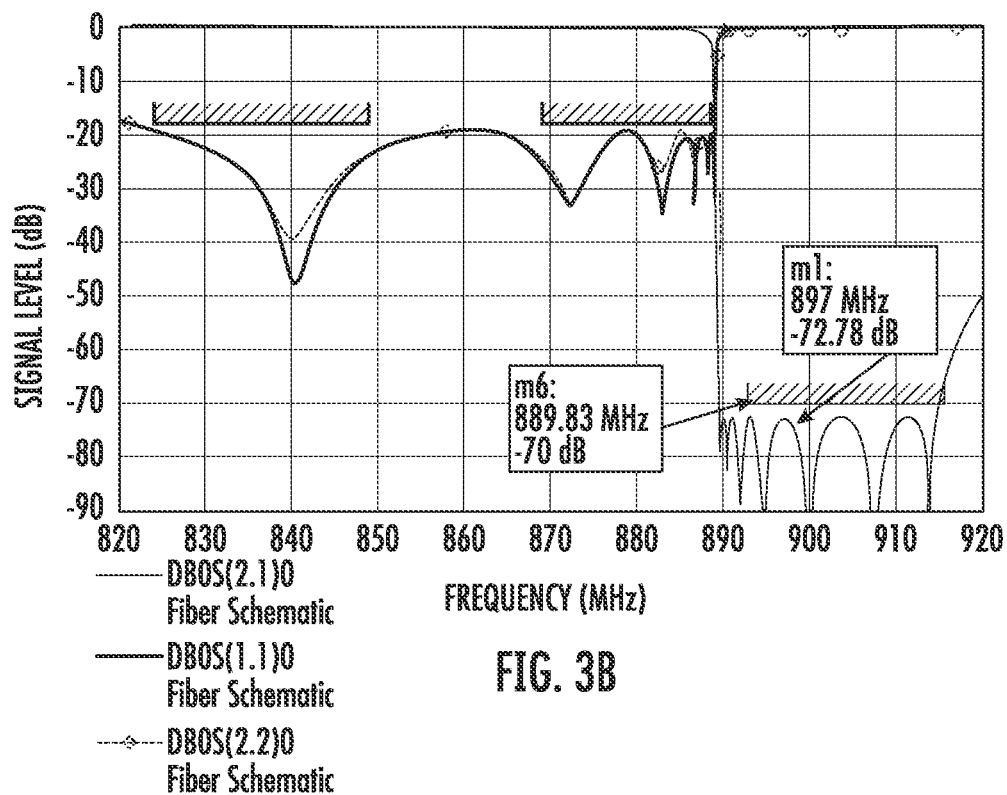
FIG. 3B is a graph of the frequency response of the filter of FIG. 3A.
Figure 6B:
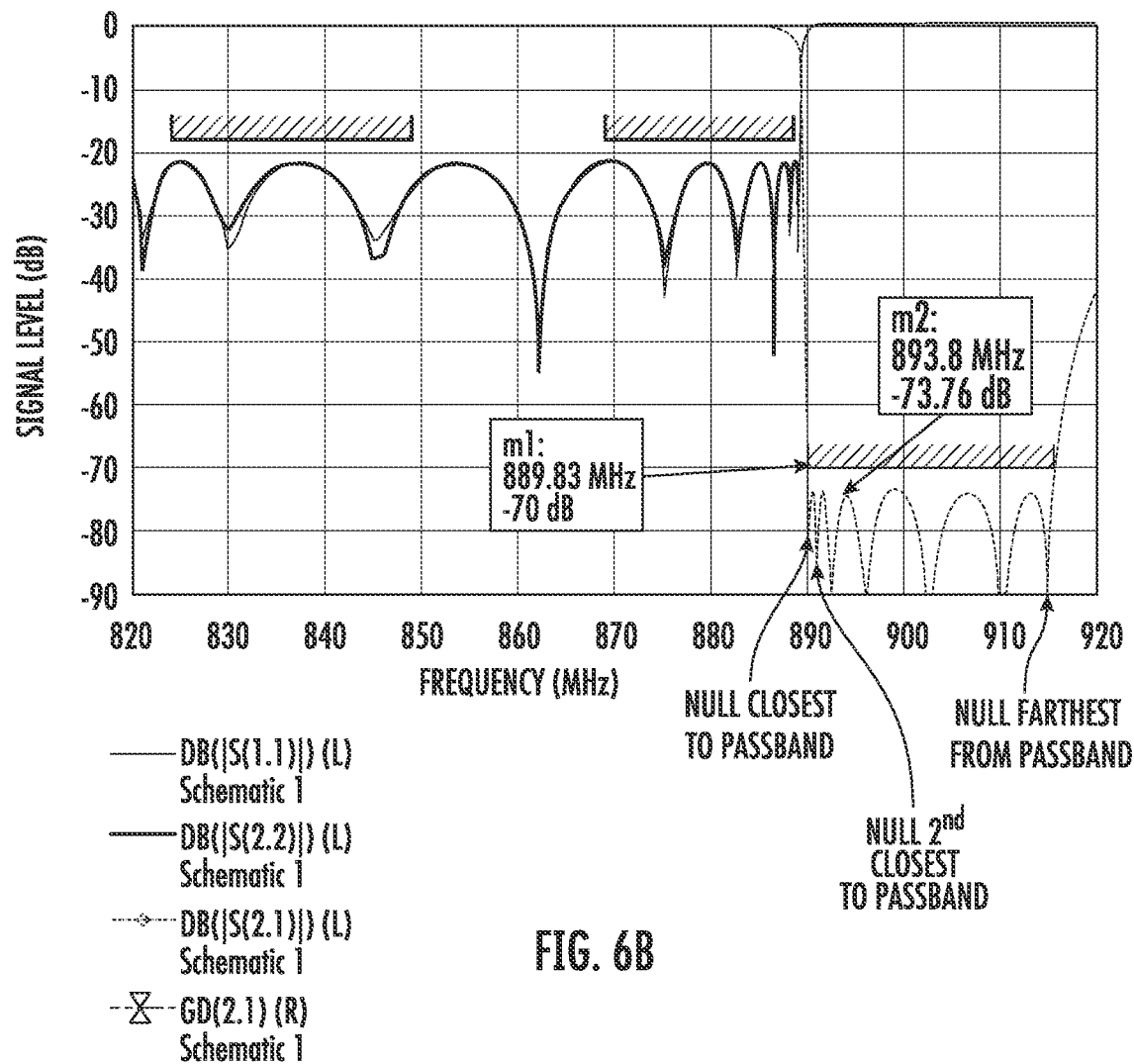
FIG. 6B is a graph of the frequency response of the filter of FIG. 6A.

FIG. 6B is a graph of the frequency response of the filter of FIG. 6A. As shown by the rectangular structures in the plot, the filter design requires two passbands (at about 824-849 MHz and 869-889 MHz) and one stopband (at about 890-915 MHz). The notch structure realizes a single passband that covers both the passband frequency ranges, similar to the filter 200' (see FIG. 3B). The resonators 542 generate the bandpass response and the resonators 530 generate the stopband response that are shown in FIG. 6B. The vertical axis in FIG. 6B shows the RF signal level at the output of the filter relative to the RF signal level at the input to the filter in dB.

As can be seen from FIG. 6B, the frequency response for filter 500 includes a plurality of nulls (i.e., locations in the frequency response of FIG. 6B where the signal level drops down to very low levels, which here are levels below −70 dB). Such nulls may also be referred to herein as "transmission zeros." A total of seven distinct nulls can be seen. Six of these nulls are generated by six of the notch resonators 542, and the seventh null is generated by a pair of the notch resonators 542. Here, the stopband extends from 890-915 MHz. Notably, the nulls are spread across the stopband, meaning that the frequencies where the nulls occur are spread out relatively evenly over the entire stopband. In particular, nulls are provided at about 890 MHz, 891 MHz, 892 MHz, 896 MHz, 902 MHz, 911 MHz and 914 MHz.

Thus, a first of the nulls (any of the nulls at 890 MHz, 891 MHz, 892 MHz, 896 MHz, 902 MHz) is in a bottom half of the stopband and a second of the nulls (either the null at 911 MHz or the null at 914 MHz) is within a top half of the stopband. Likewise, a first of the nulls (any of the nulls at 890 MHz, 891 MHz, 892 MHz, 896 MHz) is in a bottom third of the stopband, a second of the nulls (the null at 902 MHz) is within middle third of the stopband, and a third of the nulls (either the null at 911 MHz or the null at 914 MHz) is within a top third of the stopband. Similarly, a first of the nulls (any of the nulls at 890 MHz, 891 MHz, 892 MHz, 896 MHz) is in a bottom quarter of the stopband, a second of the nulls (the null at 902 MHz) is within a quarter of the of the stopband that is between the bottom quarter of the stopband and a center frequency of the stopband, and a third of the nulls is within the top quarter of the stopband (either the null at 911 MHz or the null at 914 MHz).

As noted above, the filter 500 may be an interference mitigation filter. As such (and as shown in FIG. 6B), the filter 500 may have a stopband and one or more passbands, where the passbands are all on the same side of the stopband. In some embodiments, a first subset of the resonant cavities 520 are on a first side of the bandpass filter 540 and a second subset of the resonant cavities 520 are on a second, opposite side of the bandpass filter 540, as shown in FIG. 6A.

As described above, windows 518 are provided in the first and second walls 516-1, 516-2 that allow each resonant cavity 520 to communicate with the bandpass filter 540. Each resonant cavity 520 electrically couples to the bandpass filter 540 through the windows 518. How electrically close a resonant cavity is to the input port 550 or the output port 552 will depend upon where the resonant cavity 520 electrically couples to the bandpass filter 540. For example, referring to FIG. 6A, the first resonant cavity 520-1 is electrically closest to the input port 550, the second resonant cavity 520-2 is the resonant cavity that is second electrically closest to the input port 550, the third resonant cavity 520-3 is the resonant cavity that is third electrically closest to the input port 550, the fourth resonant cavity 520-4 is the resonant cavity that is fourth electrically closest to the input port 550, the fifth resonant cavity 520-5 is the resonant cavity that is fifth electrically closest to the input port 550, the sixth resonant cavity 520-6 is the resonant cavity that is sixth electrically closest to the input port 550, the seventh resonant cavity 520-7 is the resonant cavity that is seventh electrically closest to the input port 550, and the eighth resonant cavity 520-8 is the resonant cavity that is electrically the farthest from the input port 550 (and hence electrically closest to the output port 552). Likewise, a first resonant cavity 520 is "electrically adjacent" a second resonant cavity 520 if no windows for a third resonant cavity opens to the bandpass filter 540 between the locations where the windows 518 for the first and second resonant cavities 520 open to the bandpass filter 540. Thus, the locations where the windows 518 open to the bandpass filter 540 determine how electrically close each resonant cavity 520 is to the input port 550, the output port 552, and the other resonant cavities 520.

Figure 6C:
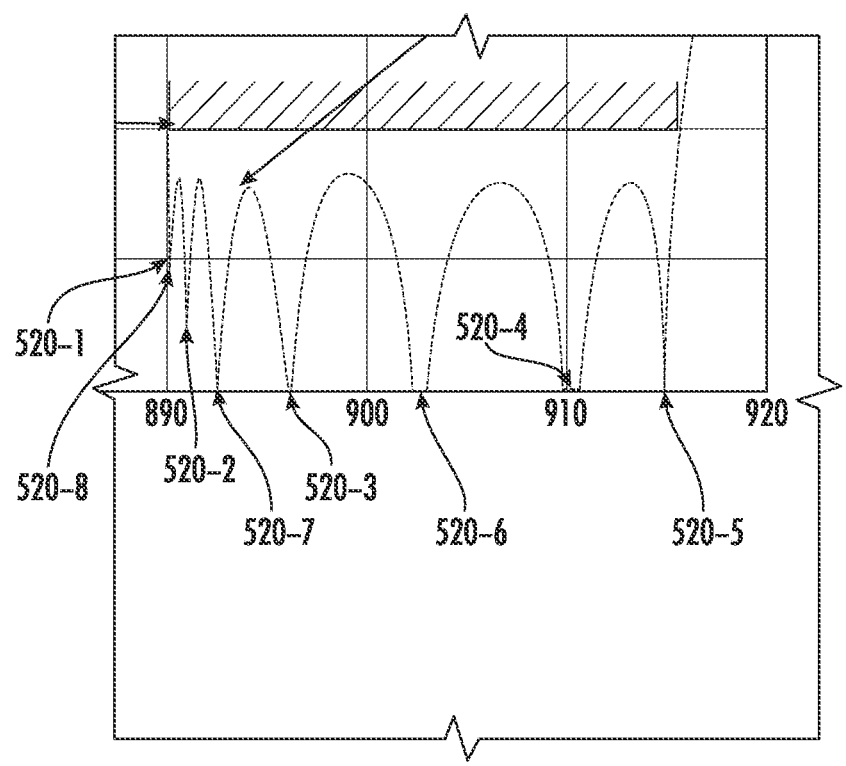
FIG. 6C is an enlarged version of the stopband portion of FIG. 6B that illustrates which resonant cavities of FIG. 6A generate the nulls in the stopband.

Pursuant to embodiments of the present invention, the resonant cavities 520 that generate the nulls in the stopband response of filter 500 may be selected so that the resonant cavities 520 that form the nulls closest to the transition between the passband and the stopband may be located far apart in terms of where the resonant cavities 520 couple to the bandpass filter 540. In one example embodiment, the resonant cavity 520-1 that is configured to generate the stopband null that is closest to the passband may be the resonant cavity that is electrically closest to the input port 550. The resonant cavity 520-8 that is configured to generate the stopband null that is second closest to the passband may be the resonant cavity 520-8 that is electrically closest to the output port 552. In another example embodiment, the resonant cavity 520-8 may be the resonant cavity that is configured to generate the stopband null that is closest to the passband, and the resonant cavity 520-1 may be the resonant cavity that is configured to generate the stopband null that is second closest to the passband. The resonant cavity 520-2 that is electrically second closest to the input port 550 may be configured to generate the stopband null that is third closest to the passband, and the resonant cavity 520-7 that is electrically second closest to the output port 552 may be configured to generate the stopband null that is fourth closest to the passband. Similarly, the resonant cavity 520-3 that is electrically third closest to the input port 550 may be configured to generate the stopband null that is fifth closest to the passband, and the resonant cavity 520-6 that is electrically third closest to the output port 552 may be configured to generate the stopband null that is electrically third farthest from the passband. The remaining two resonant cavities 520-4 and 520-5 may be configured to generate the remaining two stopband nulls, which may be the two nulls that are farthest from the passband. While in the depicted embodiment the resonant cavity 520-4 is shown as generating the null that is farthest from the passband, it will be appreciate that in other embodiments the resonant cavity 520-5 may be configured to generate the null that is farthest from the passband, and the resonant cavity 520-4 may be configured to generate the null that is second farthest from the passband. FIG. 6C is an enlarged version of the stopband portion of FIG. 6B that illustrates which resonant cavities of FIG. 6A generate the nulls in the stopband.

Thus, in some embodiments, a first of the resonant cavities 520 that is configured to generate the stopband null that is closest to the passband is not adjacent to a second of the resonant cavities that is configured to generate a second of the stopband nulls that is second closest to the passband. In some embodiments, at least half of the resonant cavities may be in between the first of the resonant cavities that is configured to generate the first of the plurality of nulls that is closest to the passband and the second of the resonant cavities that is configured to generate the second of the plurality of nulls that is second closest to the passband. In still other embodiments, the resonant cavity 520 that is configured to generate the null that is farthest from the passband may be electrically adjacent a resonant cavity 520 that is configured to generate the null that is second farthest from the passband.

As discussed above, interference mitigation filters are commonly used in applications where two cellular operators have base station antennas mounted on the same tower that provide service in the same frequency bands. Each cellular operator may use different sub-bands in these frequency bands to limit interference. Each sub-band may, for example, be a 10 MHz or 20 MHz sub-band, and each operator will use a first sub-band for the downlink and a second sub-band for the uplink. Unfortunately, the sub-bands used by the two different operators may be very close to each other (e.g., as close as a few MHz). Thus, each operator may include interference mitigation filters along the RF paths through the antenna that pass signals in the operating frequency sub-band of the antenna (i.e., the passband) while attenuating signals in the operating frequency sub-band of the other antenna (i.e., the stopband). In some embodiments, the passband frequency range may have a first bandwidth, and a range of frequencies between the passband frequency range and the stopband frequency range may be less than twice the first bandwidth. In other embodiments, the range of frequencies between the passband frequency range and the stopband frequency range may be less than the first bandwidth, less than ½ the first bandwidth, or less than one-quarter the first bandwidth. In some cases, the interference mitigation filters may be external to the antenna (e.g., implemented as a tower mounted filter).

Figure 1B:
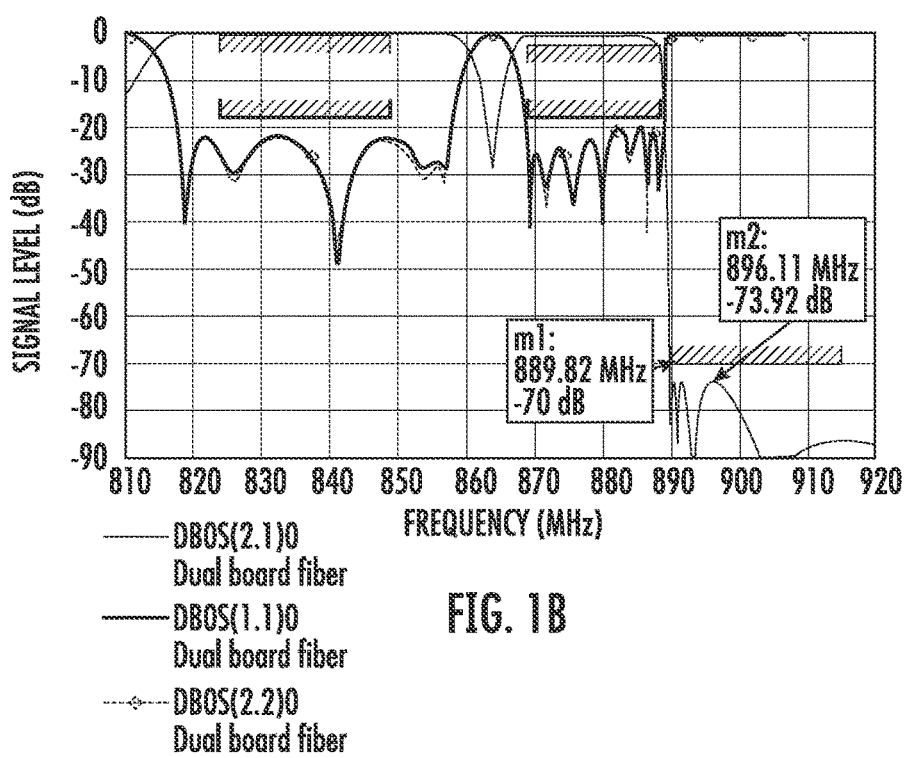
FIG. 1B is a graph of the frequency response of the filter of FIG. 1A.

The filter 500 may be both smaller and less expensive to manufacture than a conventional interference mitigation filter having the design of FIG. 1 that provides comparable performance, and may also exhibit lower attenuation in the passband and have higher power handling capabilities. The filter 500 may be cheaper to manufacture than the conventional interference mitigation filters having the designs of FIGS. 2-3A, and may also exhibit improved PIM performance and be less susceptible to thermal variations than these filters. The filter 500 may also have a much wider tuning range and be easier to tune than the filters of FIGS. 2-3A. For example, in some cases it may be possible to reverse the positions of the stopband and the passband simply by adjusting the tuning screws on filter 500. This means that the same filter could be used by two cellular operators that operate at the same base station.

It will be appreciated that many modifications may be made to the filter 500 without departing from the scope of the present invention. For example, the number of resonant cavities 520 and resonators 530 may be varied based on a desired filter response. As another example, the locations of the resonant cavities 520 may be changed. Different types of resonators 530, 542 may be used, and the input and output ports 550, 552 may have any conventional port design. The internal cover 570 may be soldered in place rather than fixed using screws, and any appropriate type of tuning elements may be used. The number and arrangement of bandpass resonators 542 may be selected based on a desired response for the filter.

Figure 7:
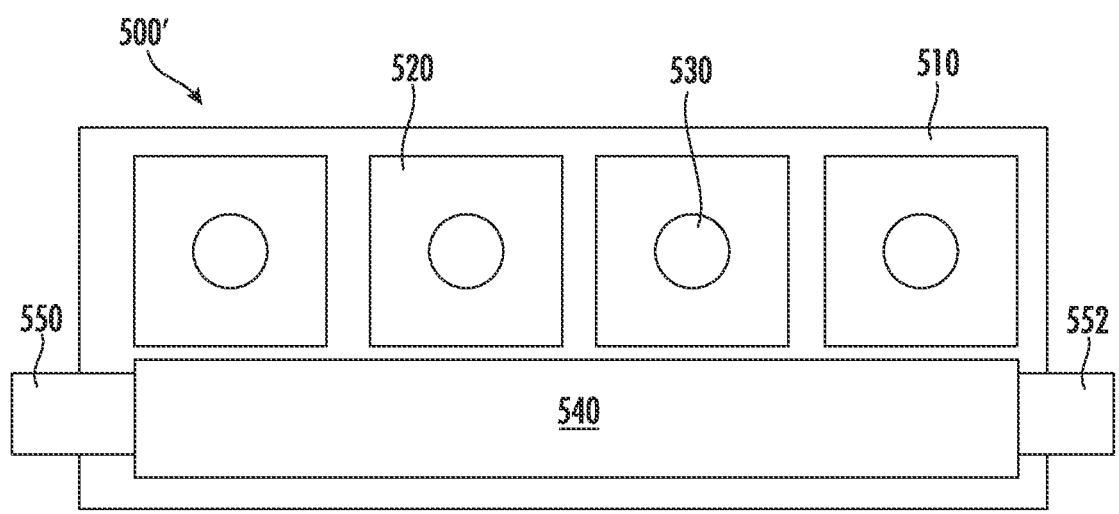
FIG. 7 is a schematic diagram of an interference mitigation filter according to further embodiments of the present invention.

FIG. 7 is a schematic diagram of an interference mitigation filter 500' according to further embodiments of the present invention. The filter 500' is very similar to the filter 400 of FIG. 5, except that the filter 500' only includes resonant cavities 520 on one side of the bandpass filter 540. Thus, the first sidewall of the bandpass filter 540 comprises an internal wall and the second sidewall may comprise an external wall of the housing 510 in this embodiment.

It will be appreciated that the techniques disclosed herein may be used in filters other than interference mitigation filters. For example, low-loss combiners include RF transmission lines that could be implemented as bandpass filters according to the teachings of the present invention.

While the example filters 400, 500, 500' according to embodiments of the present invention that are illustrated in FIGS. 5-7 above include either four or eight resonant cavities, it will be appreciated that any appropriate number of cavities may be provided as necessary to provide a filter having desired filtering characteristics. Likewise, the number of resonators included in the bandpass filter may be varied as appropriate.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A filter, comprising:
a housing having an input port and an output port;
a plurality of resonant cavities within the housing, each resonant cavity including a respective notch resonator; and
a bandpass filter that includes a plurality of bandpass resonators, the bandpass filter extending between the input port and the output port,
wherein the filter is an interference mitigation filter that includes a passband and a stopband, and
wherein the notch resonators are configured to generate a plurality of nulls within the stopband,
wherein a first of the resonant cavities that is configured to generate a first of the nulls that is closest to the passband is not electrically adjacent a second of the resonant cavities that is configured to generate a second of the nulls that is second closest to the passband.

2. The filter of claim 1, wherein the first of the nulls is in a bottom half of the stopband and the second of the nulls is within a top half of the stopband.

3. The filter of claim 1, wherein the first of the nulls is in a bottom third of the stopband, the second of the nulls is within middle third of the stopband, and a third of the nulls is within a top third of the stopband.

4. The filter of claim 1, wherein the first of the nulls is in a bottom quarter of the stopband, the second of the nulls is within a quarter of the of the stopband that is between the bottom quarter of the stopband and a center frequency of the stopband, and a third of the nulls is within a top quarter of the stopband.

5. The filter of claim 4, wherein none of the nulls are within a quarter of the stopband that is between the top quarter of the stopband and the center frequency of the stopband.

6. The filter of claim 1, wherein the filter only has a passband on one side of the stopband.

7. The filter of claim 1, wherein a first subset of the resonant cavities are on a first side of the bandpass filter, and a second subset of the resonant cavities are on a second, opposite side of the bandpass filter.

8. The filter of claim 1, wherein at least half of the resonant cavities electrically couple to the bandpass filter in between a first location where a first of the resonant cavities that is configured to generate a first of the plurality of nulls that is closest to the passband electrically couples to the bandpass filter and a second location where a second of the resonant cavities that is configured to generate a second of the plurality of nulls that is second closest to the passband electrically couples to the bandpass filter.

9. The filter of claim 1, further comprising a plurality of tuning screws, the tuning screws coaxially aligned with respective ones of the notch resonators and the bandpass resonators.

10. A filter, comprising:
a housing having an input port and an output port;
a plurality of resonant cavities within the housing, each resonant cavity including a respective notch resonator; and
a bandpass filter that includes a plurality of bandpass resonators, the bandpass filter extending between the input port and the output port,
wherein the filter is an interference mitigation filter that includes a passband and a stopband, and
wherein the notch resonators are configured to generate a plurality of nulls within the stopband,
wherein a first resonant cavity that is electrically closest to the input port is configured to generate a first of the plurality of nulls and a second resonant cavity that is electrically closest to the output port is configured to generate a second of the plurality of nulls, wherein the first of the plurality of nulls and the second of the plurality of nulls are the two nulls that are closest to the passband.

11. The filter of claim 10, wherein the first of the plurality of nulls is the null that is closest to the passband.

12. The filter of claim 11, wherein a third resonant cavity that is electrically second closest to the input port is configured to generate a third of the plurality of nulls that is third closest to the passband.

13. The filter of claim 12, wherein a fourth resonant cavity that is electrically second closest to the output port is configured to generate a fourth of the plurality of nulls that is fourth closest to the passband.

14. A filter, comprising:
a housing having an input port and an output port;
a plurality of resonant cavities within the housing, each resonant cavity including a respective notch resonator; and
a bandpass filter that includes a plurality of bandpass resonators, the bandpass filter extending between the input port and the output port,
wherein the filter is an interference mitigation filter that includes a passband and a stopband, and
wherein the notch resonators are configured to generate a plurality of nulls within the stopband,
wherein a first of the resonant cavities that is configured to generate a first of the plurality of nulls that is farthest from the passband is electrically adjacent a second of the resonant cavities that is configured to generate a second of the plurality of nulls that is second farthest from the passband.

15. A filter, comprising:
a housing having an input port and an output port;

a transmission line that extends between the input port and the output port; and a plurality of resonant cavities within the housing, each resonant cavity including a respective first resonator, wherein the transmission line comprises a bandpass filter that includes a plurality of second resonators, and wherein all of the resonant cavities include a window that opens to the bandpass filter, wherein the second resonators are disposed between a first wall and a second wall, and at least some of the resonant cavities are on one side of the first wall, wherein windows are provided in the first wall that allow radio frequency ("RF") energy to pass from the bandpass filter into the respective resonant cavities, and no windows are provided between adjacent ones of the resonant cavities, and wherein the second resonators are arranged in a staggered line that extends substantially from the input port to the output port.

16. The filter of claim 15, wherein the filter is an interference mitigation filter that includes a passband and a stopband, and wherein the first resonators are configured to generate a plurality of nulls within the stopband.

17. The filter of claim 16, wherein a first of the nulls is in a bottom third of the stopband, a second of the nulls is within middle third of the stopband, and a third of the nulls is within a top third of the stopband.

18. The filter of claim 16, wherein a first of the resonant cavities that is electrically closest to the input port is configured to generate a first of the plurality of nulls and a second of the resonant cavities that is electrically closest to the output port is configured to generate a second of the plurality of nulls, wherein the first of the plurality of nulls and the second of the plurality of nulls are the two nulls of the plurality of nulls that are closest to the passband.

19. The filter of claim 16, wherein a first of the resonant cavities that is configured to generate a first of the plurality of nulls that is closest to the passband is not electrically adjacent a second of the resonant cavities that is configured to generate a second of the plurality of nulls that is second closest to the passband.

20. The filter of claim 19, wherein a third of the resonant cavities that is configured to generate a null that is farthest from the passband is electrically adjacent a fourth of the resonant cavities that is configured to generate a null that is second farthest from the passband.

* * * * *